(12) United States Patent
Cachovan et al.

(10) Patent No.: US 11,574,184 B2
(45) Date of Patent: Feb. 7, 2023

(54) MULTI-MODAL RECONSTRUCTION NETWORK

(71) Applicant: Siemens Medical Solutions USA, Inc., Malvern, PA (US)

(72) Inventors: Michal Cachovan, Baiersdorf (DE); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 654 days.

(21) Appl. No.: 16/570,092

(22) Filed: Sep. 13, 2019

(65) Prior Publication Data

US 2021/0081778 A1    Mar. 18, 2021

(51) Int. Cl.
| | | |
|---|---|---|
| G06K 9/00 | (2022.01) | |
| G06N 3/08 | (2006.01) | |
| G06T 7/00 | (2017.01) | |
| G05B 13/02 | (2006.01) | |
| G06K 9/62 | (2022.01) | |
| G06T 7/30 | (2017.01) | |
| G06T 15/08 | (2011.01) | |

(52) U.S. Cl.
CPC ............ *G06N 3/08* (2013.01); *G05B 13/027* (2013.01); *G06K 9/6262* (2013.01); *G06T 7/0012* (2013.01); *G06T 7/30* (2017.01); *G06T 15/08* (2013.01); *G06T 2207/10081* (2013.01); *G06T 2207/10088* (2013.01); *G06T 2207/10108* (2013.01); *G06T 2207/10116* (2013.01); *G06T 2207/20081* (2013.01); *G06T 2207/20084* (2013.01)

(58) Field of Classification Search
CPC ........ G06N 3/08; G06N 3/0454; G06N 3/084; G05B 13/027; G06K 9/6262; G06K 9/6256; G06K 9/6293; G06T 7/0012; G06T 7/30; G06T 15/08; G06T 2207/10081; G06T 2207/10088; G06T 2207/10108; G06T 2207/10116; G06T 2207/20081; G06T 2207/20084; G06T 11/006; G06T 2210/41; G06T 19/00; G06V 10/82
USPC .......................................................... 706/25
See application file for complete search history.

(56) References Cited

U.S. PATENT DOCUMENTS

| | | | |
|---|---|---|---|
| 10,064,593 B2 | 9/2018 | Ma et al. | |
| 10,292,671 B2 | 5/2019 | Sanders et al. | |
| 10,303,849 B2 | 5/2019 | Cachovan et al. | |
| 10,395,353 B2 | 8/2019 | Rong et al. | |
| 2016/0093048 A1* | 3/2016 | Cheng | G06V 30/194 382/131 |
| 2016/0292849 A1* | 10/2016 | Lee | G06T 5/001 |
| 2017/0098316 A1* | 4/2017 | Ma | G06T 11/008 |
| 2018/0061031 A1* | 3/2018 | Rong | A61B 6/5258 |
| 2018/0300907 A1* | 10/2018 | Ding | G06T 11/006 |

(Continued)

OTHER PUBLICATIONS

Vija, et al., Quantitative SPECT for Time Activity Curve Estimation Using Extra Modal Information for the Theranostics Application, Prior Art Journal 2016, vol. 19, DOI 10.18169/PAPDEOTT005723.

*Primary Examiner* — Van D Huynh (57) ABSTRACT

A system and method include training of an artificial neural network to generate an output data set, the training based on the plurality of sets of emission data acquired using a first imaging modality and respective ones of data sets acquired using a second imaging modality.

12 Claims, 6 Drawing Sheets

(56) References Cited

U.S. PATENT DOCUMENTS

| | | | | |
|---|---|---|---|---|
| 2018/0315223 A1* | 11/2018 | Vija | ..................... | G06T 11/005 |
| 2019/0130569 A1* | 5/2019 | Liu | ......................... | G06T 5/50 |
| 2020/0126231 A1* | 4/2020 | Hu | ....................... | G06T 11/008 |
| 2020/0289077 A1* | 9/2020 | Bai | ....................... | A61B 6/037 |

* cited by examiner

MULTI-MODAL RECONSTRUCTION NETWORK

BACKGROUND

Conventional medical images may be generated via transmission tomography imaging or emission tomography imaging. In transmission tomography imaging, the imaging source (e.g., an X-ray source) is external to the subject and the source radiation (e.g., X-rays) is transmitted through the subject to a detector. According to emission tomography imaging, the imaging source (e.g., a gamma ray-emitting radiopharmaceutical) is internal to the subject (e.g., due to injection or ingestion thereof) and the source radiation (e.g., gamma rays) is emitted from within the subject to a detector. In either case, absorption or scattering within the subject tissue attenuates the source radiation prior to reception of the source radiation by the detector.

Different imaging modalities may measure different aspects of an imaged subject. For example, Single-Photon Emission Computed Tomography (SPECT) imaging systems measure uptake activity, Computed Tomography (CT) imaging systems measure tissue density, and Magnetic Resonance (MR) imaging systems measure proton density. Since each of these modalities provides unique information about a same biological system, it is often desirable to incorporate the data acquired via two or more imaging modalities.

For example, tomographic reconstruction of emission data may utilize supplemental data obtained using other imaging modalities such as MR and CT. The supplemental data may be obtained by segmenting the CT/MR image data to, for example, identify tissue locations and characteristics. Such reconstruction can be time and resource-consuming, particularly in the case of current quantitative iterative reconstruction techniques. Some imaging systems might lack the processing power to timely generate such reconstructions and/or may be unable to produce data of the type needed for such reconstructions. What is needed are efficient systems to generate reconstructed images from multi-modal image data.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide generation of a high-resolution reconstructed volume based on an input low-resolution reconstructed volume and an input higher-resolution reconstructed volume. The generated high-resolution reconstructed volume includes information of both the input low-resolution reconstructed volume and the input higher-resolution reconstructed volume. For example, embodiments may generate a high-resolution reconstructed volume based on a low-resolution volume reconstructed from a PET scan and a corresponding higher-resolution volume reconstructed from a CT scan. The high-resolution reconstructive volume may provide quantitative information in some embodiments.

In some embodiments, an artificial neural network is trained to output results similar to those achieved via 1) segmentation of an input high-resolution reconstructed volume, and 2) reconstruction based on the segmentation and an input low-resolution reconstructed volume. Embodiments may therefore be useful for deployment in systems which use data formats which are incompatible with certain reconstruction techniques, employ outdated reconstruction techniques, are processing resource-limited, and/or require fast processing.

Figure 1:
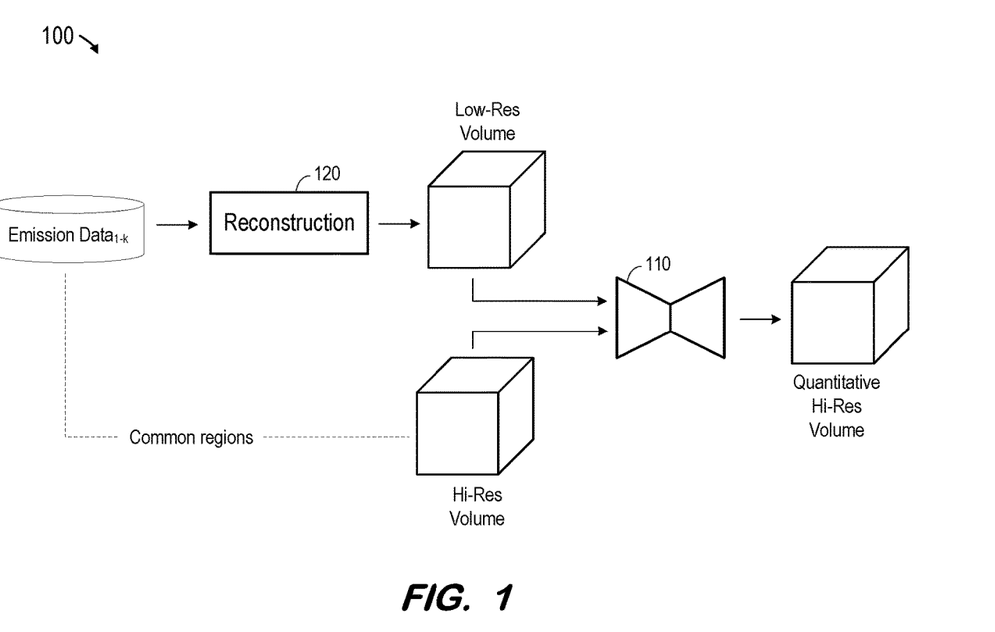
FIG. 1 is a block diagram of a system deploying a trained artificial neural network to generate a high-resolution image volume from a low-resolution volume according to some embodiments.

FIG. 1 is a block diagram of a deployed system according to some embodiments. System 100 includes trained network 110. Training of network 110 according to some embodiments will be described below. Although depicted as a neural network, network 110 may comprise any type of processing system to implement a function resulting from the below-described training. For example, network 110 may comprise a software application programmed to implement a function generated via prior neural network training.

In operation, emission $data_{1-k}$ is acquired via a first imaging modality. For example, emission $data_{1-k}$ may be acquired by a PET or SPECT scanner after injection of a radioactive tracer into a subject volume (e.g., a patient or a phantom). Emission $data_{1-k}$ may be acquired at several different projection angles as is known in the art, and may conform to any suitable data format (e.g., list mode, 2D projection data, etc.)

Reconstruction component 120 applies a reconstruction algorithm to emission $data_{1-k}$ as is known in the art to generate a low-resolution reconstructed volume. The applied reconstruction algorithm does not use image data acquired by a different modality and therefore does not require segmentation of or registration with image data acquired by a different modality. Reconstruction component 120 may apply conjugate gradient, attenuation and scatter (CGAS) reconstruction, filtered back-projection (FBP) reconstruction or any other suitable technique to emission $data_{1-k}$.

The low-resolution volume generated by reconstruction component 120 is input to network 110. Also input to network 110 is a higher-resolution volume which is generated using a different imaging modality than the modality used to generate emission $data_{1-k}$. For example, emission $data_{1-k}$ may be acquired by a PET or SPECT scanner as described above while the higher resolution may comprise a CT volume acquired using a CT scanner. The dashed line of FIG. 1 indicates that the imaged regions are similar (e.g., a same patient) for both modalities. For purposes of the present description, two imaging modalities are considered "different" if they differ in any way in their acquisition, processing and/or reconstruction of imaging data. For example, the low-resolution volume may be generated based on emission data$_{1-k}$ and a first reconstruction kernel, while the higher-resolution volume may be generated based on emission data$_{1-k}$ and a second reconstruction kernel.

Trained network 110 outputs a quantitative high-resolution volume based on the input volumes. Some embodiments therefore train network 110 to output a data set which is similar to a data set which would be acquired via segmentation of the input high-resolution reconstructed volume, and reconstruction based on the segmentation and the input low-resolution reconstructed volume.

According to some embodiments, trained artificial neural network 110 implements a function. The function may be characterized as a set of trained parameter values associated with each network node. The function may be deployed as is known in the art to any computing device.

Figure 2:
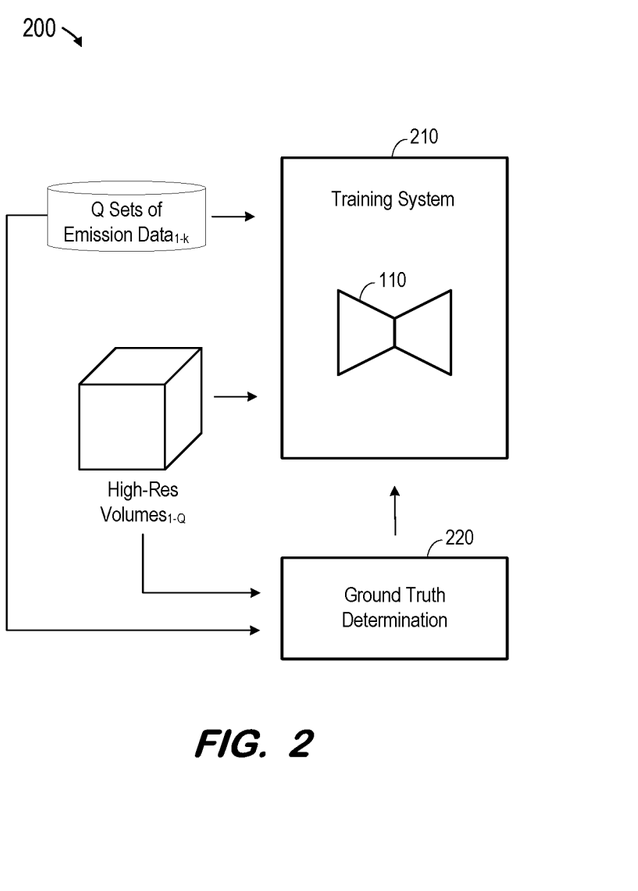
FIG. 2 is a block diagram of a system to train an artificial neural network to generate a high-resolution image volume from a low-resolution volume according to some embodiments.

FIG. 2 illustrates architecture 200 for training network 110 to generate a high-resolution volume according to some embodiments. Network 110 may be trained temporally and/or geographically distant from the deployment depicted in FIG. 1. For example, architecture 200 may be implemented at a data processing facility while system 100 may execute within an imaging theater in which a patient has just been imaged.

Training system 210 uses Q sets of emission data$_{1-k}$ and high-resolution volumes$_{1-Q}$ to train artificial neural network 110. Q sets of emission data$_{1-k}$ and high-resolution volumes$_{1-Q}$ are also used to generate ground truth data 220 for evaluating the performance of network 110 during training by training system 210. For example, for each x=1 through Q, training system 210 may reconstruct a low-resolution volume$_x$ based on set x of emission data$_{1-k}$, and input the low-resolution volume$_x$ and high-resolution volume, to network 110. In alternative embodiments, for each x=1 through Q, training system 210 inputs a set x of emission data$_{1-k}$ and a high-resolution volume$_x$ to network 110, and network 110 generates an output volume based on the set x of emission data$_{1-k}$ and the high-resolution volume$_x$. In either case, output of network 110 is compared against a high-resolution volume reconstructed from set x of emission data$_{1-k}$ and high-resolution volume), using quantitative and iterative reconstruction methods. Network 110 is then modified based on the comparisons and the process repeats until satisfactory network performance is achieved.

Artificial neural network 110 may comprise any type of network which is trainable to approximate a function. In some embodiments as will be described with respect to FIG. 4, network 110 receives two three-dimensional images and outputs a three-dimensional image. Network 110 may comprise an implementation of a "u-net" convolutional network architecture as is known in the art.

Generally, artificial neural network 110 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data. Artificial neural network 110 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

According to some embodiments, trained artificial neural network 110 implements a function of its inputs. The function may be characterized as a set of parameter values associated with each network node. The function may be deployed as is known in the art to an external system such as system 100 of FIG. 1. In one example, the training generates parameter values for kernels of a fully convolutional network. Another fully convolutional network comprising thusly-parameterized kernels may be efficiently incorporated within a system such as system 100 to generate a high-resolution volume as described herein.

Training system 210 may comprise any system or systems for training an artificial neural network that are or become known. For example, training system 210 may employ supervised learning, unsupervised learning and/or reinforcement learning.

The Q sets of emission data$_{1-k}$ and high-resolution volumes$_{1-Q}$ may represent many different patients, phantoms, or other subjects. Moreover, the Q sets of emission data$_{1-k}$ and high-resolution volumes$_{1-Q}$ may be acquired at different locations using different contrast settings. Generally, trained network 110 may be used to generate a volume based on input data of any modalities so long as those modalities were well represented in the training data sets.

Figure 3:
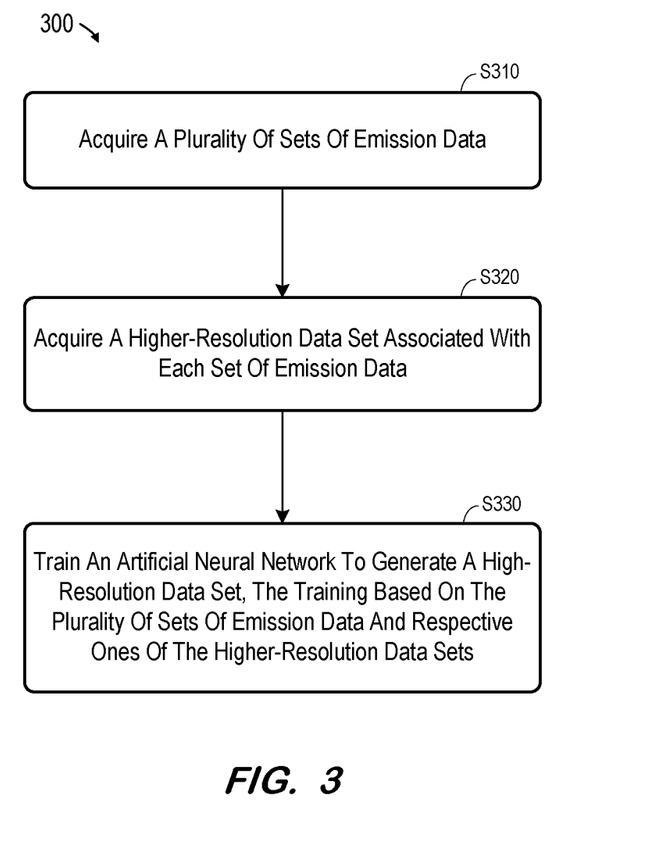
FIG. 3 is a flow diagram of a network training process according to some embodiments.

FIG. 3 is a flow diagram of a network training process according to some embodiments. Process 300 and the other processes described herein may be performed using any suitable combination of hardware and software. Software program code embodying these processes may be stored by any non-transitory tangible medium, including but not limited to a fixed disk, a volatile or non-volatile random access memory, a DVD, a Flash drive, or a magnetic tape. Embodiments are not limited to the examples described below.

Initially, at S310, a plurality of sets of emission data are acquired. The emission data may be acquired via a nuclear imaging scan, a CT scan, and/or any other imaging modality that is or becomes known. Next, at S320, a higher-resolution data set associated with each set of low-resolution emission data is acquired. As described above, if one of the sets of emission data is acquired via a PET scan, the associated higher-resolution data set may comprise a three-dimensional volume acquired substantially contemporaneously using a CT scanner.

An artificial neural network is trained at S330 based on the data acquired at S310 and S320. The artificial neural network is trained to generate a high-resolution data set based on the plurality of sets of low-resolution emission data and respective ones of the higher-resolution data set. According to some embodiments, and as will be described in more detail below, the artificial neural network is trained to generate a dataset similar to a dataset which would be generated by applying reconstruction algorithms to the emission data which utilize information of the higher-resolution data set.

In some embodiments, training of the network involves determining a loss based on the output of the network and iteratively modifying the network based on the loss until the loss reaches an acceptable level or training otherwise terminates (e.g., due to time constraints or to the loss asymptotically approaching a lower bound). Training of the network at S330 may occur well after and separate from acquisition of the training data. For example, the training data may be acquired and accumulated in an image repository over several months or years prior to execution of S330.

Figure 4:
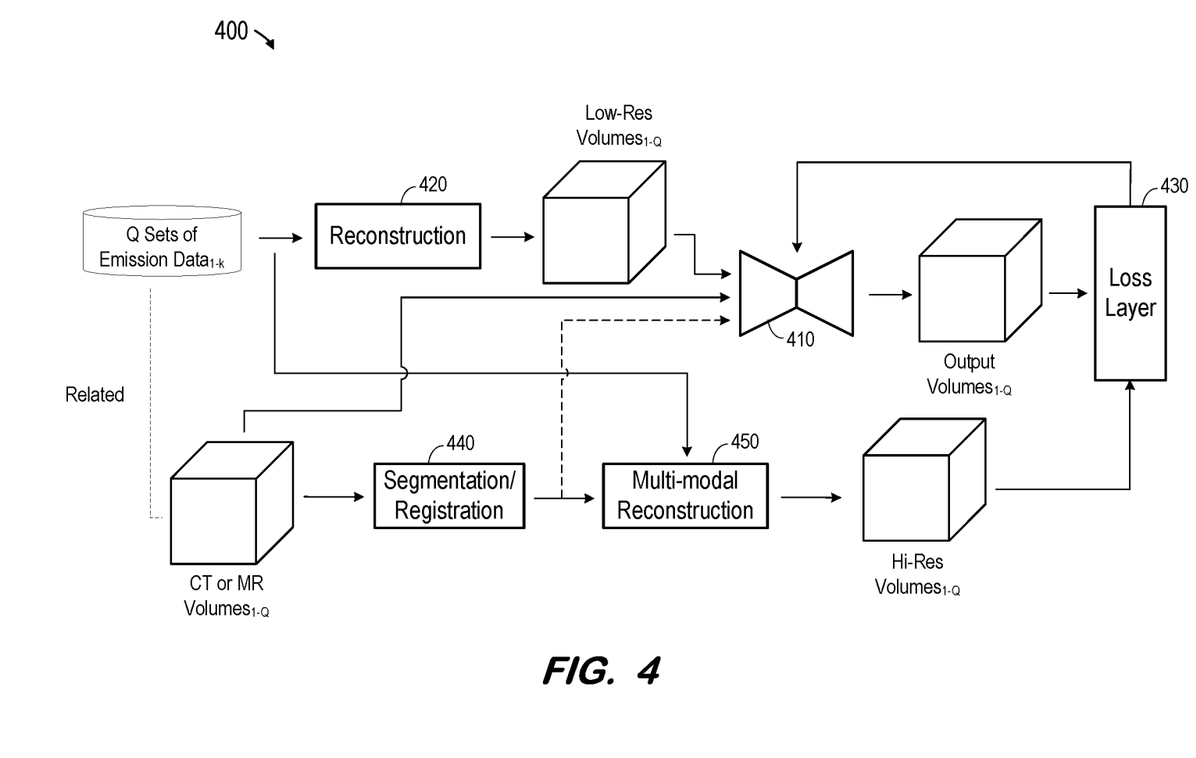
FIG. 4 is a block diagram of an artificial neural network training architecture according to some embodiments.

FIG. 4 illustrates training at S330 according to some embodiments. During training, reconstruction component 420 generates low-resolution volumes$_{1-Q}$ based on Q sets of emission data$_{1-k}$ acquired at S310. Low-resolution volumes$_{1-Q}$ are input to network 410 along with related higher-resolution (e.g., CT or MR) volumes$_{1-Q}$ received at S320. In response, network 410 outputs output volumes$_{1-Q}$.

Loss layer component 430 determines a loss by comparing each output volume$_{1-Q}$ to a corresponding "ground truth" high-resolution volume$_{1-Q}$. In the example of FIG. 4, each of ground truth high-resolution volumes$_{1-Q}$ is generated by segmenting and registering a corresponding one of higher-resolution (e.g., CT or MR) volumes$_{1-Q}$ using segmentation/registration component 440 as is known in the art, and executing multi-modal reconstruction component 450 to perform multi-modal reconstruction based on a corresponding set of projection images$_{1-k}$ and the output of segmentation/registration component 440. Notably, the reconstruction performed by component 450 differs from that performed by component 420.

As illustrated by the dashed arrow, network 410 may receive additional information during training according to some embodiments. In the particular example of FIG. 4, the additional data is the output of segmentation/registration component 440. Embodiments may train network 410 based on any number or types of information.

The total loss is back-propagated from loss layer component 430 to network 410. The loss may comprise an L1 loss, and L2 loss, or any other suitable measure of total loss. An L1 loss is the sum of the absolute differences between each output volume and its corresponding ground truth volume, and an L2 loss is the sum of the squared differences between each output volume and its corresponding ground truth volume.

Network 410 changes its internal weights, or kernel parameter values, based on the back-propagated loss as is known in the art. The training data is again processed by network 410 and loss layer 430 as described above, and the process repeats, until it is determined that the loss has reached an acceptable level or training otherwise terminates. At termination, network 410 may be considered trained. Conceptually, network 410 has been trained to simulate the algorithms executed by components 440 and 450. In some embodiments, the function implemented by now-trained network 410 (e.g., embodied in parameter values of trained convolutional kernels) may then be deployed as shown in FIG. 1.

Reconstruction component 420, segmentation/registration component 440, multi-modal reconstruction component 450, and each functional component described herein may be implemented in computer hardware, in program code and/or in one or more computing systems executing such program code as is known in the art. Such a computing system may include one or more processing units which execute processor-executable program code stored in a memory system. Moreover, network 410 may comprise hardware and software specifically-intended for executing algorithms based on a specified network architecture and trained kernel parameters.

Figure 5:
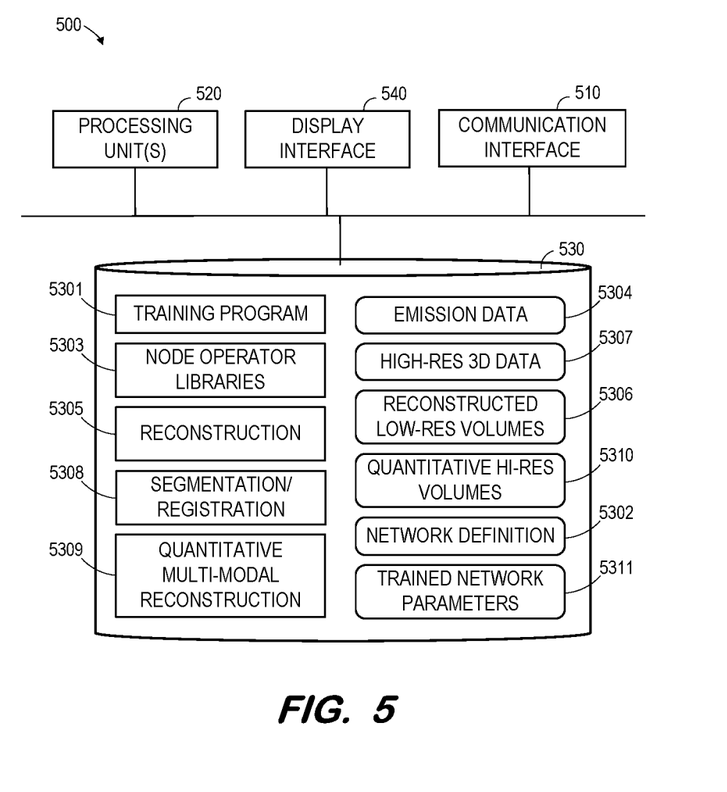
FIG. 5 is a block diagram of a computing system to train an artificial neural network to generate according to some embodiments.

FIG. 5 illustrates computing system 500 according to some embodiments. System 500 may comprise a computing system to facilitate the design and training of an artificial neural network as is known in the art. Computing system 500 may comprise a standalone system, or one or more elements of computing system 500 may be located in the cloud.

System 500 includes communication interface 510 to communicate with external devices via, e.g., a network connection, and a display interface 540. Processing unit(s) 520 may comprise one or more processors, processor cores, or other processing units to execute processor-executable process steps. In this regard, storage system 530, which may comprise one or more memory devices (e.g., a hard disk drive, a solid-state drive), stores processor-executable process steps of training program 5301 which may be executed by processing unit(s) 520 to train a network as described herein.

Training program 5301 may utilize node operator libraries 5303, which includes code to execute various operations associated with node operations. According to some embodiments, computing system 500 provides interfaces and development software (not shown) to enable development of training program 5301 and generation of network definition 5302 which specifies the architecture of the neural network to be trained. Storage device 530 may also include, with reference to the elements of FIG. 4, program code of single-modal reconstruction component 5305, segmentation/registration component 5308, and quantitative multi-modal reconstruction component 5309.

Data used for training the network may also be stored in storage device 530, including but not limited to emission data 5304, higher-resolution three-dimensional data 5307, reconstructed low-resolution volumes 5306, and ground truth quantitative hi-resolution volumes 5310 as described with respect to FIG. 4. Once trained, the parameters of the neural network may be stored as trained network parameters 5311. As mentioned above, these trained parameters may be deployed in other systems as is known in the art to provide the trained functionality.

Figure 6:
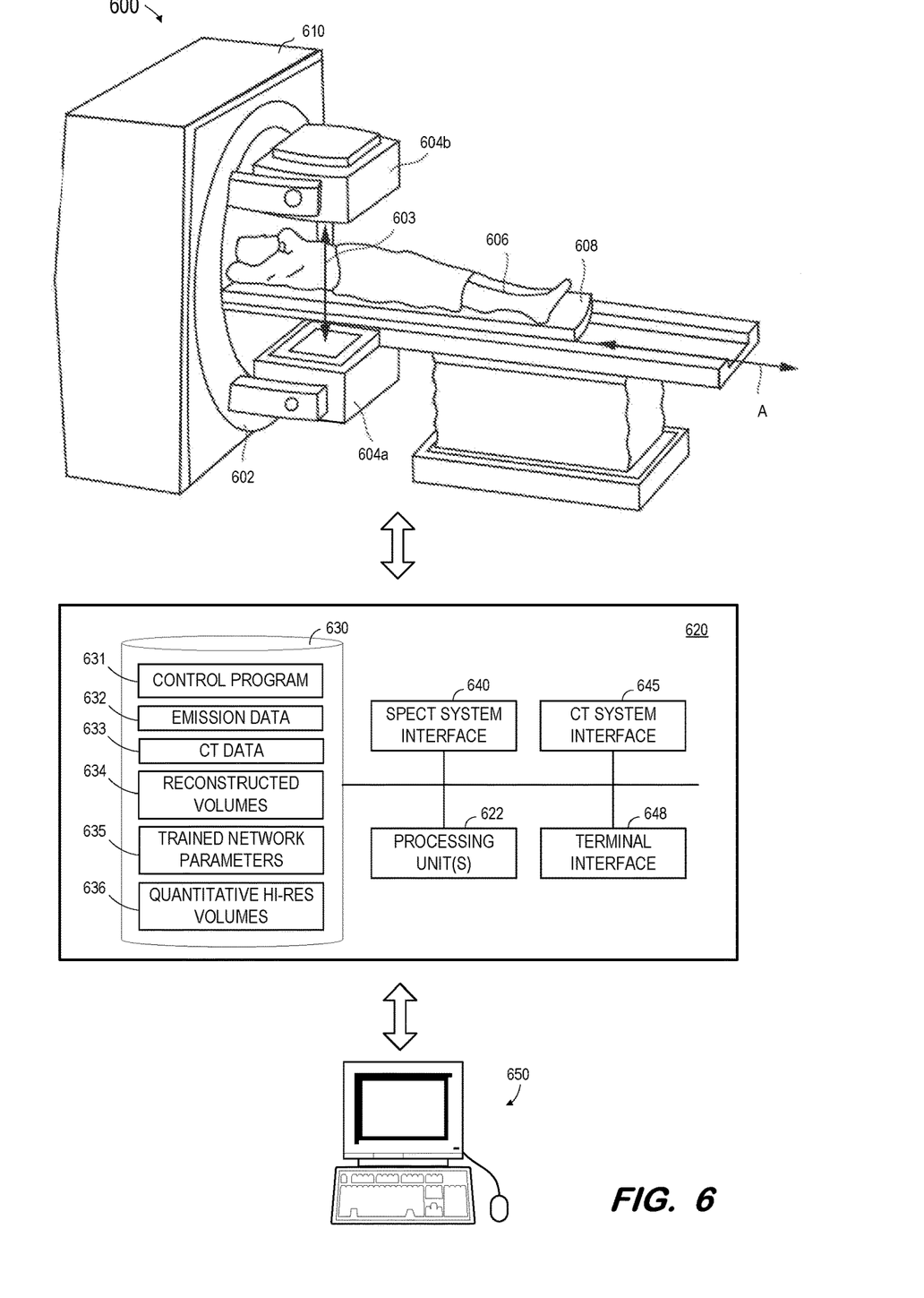
FIG. 6 illustrates a dual transmission and emission imaging SPECT/CT system deploying a trained neural network according to some embodiments.

FIG. 6 illustrates SPECT-CT system 600 which may deploy a trained network to generate high-resolution volumes based on CT data and lower-resolution nuclear imaging data as described herein.

System 600 includes gantry 602 to which two or more gamma cameras 604a, 604b are attached, although any number of gamma cameras can be used. A detector within each gamma camera detects gamma photons (i.e., emission data) 603 emitted by a radioisotope within the body of a patient 606 lying on a bed 608.

Bed 608 is slidable along axis-of-motion A. At respective bed positions (i.e., imaging positions), a portion of the body of patient 606 is positioned between gamma cameras 604a, 604b in order to capture emission data from that body portion. Gamma cameras 604a, 604b may include multifocal cone-beam collimators or parallel-hole collimators as is known in the art.

System 600 also includes CT housing 610 including an X-ray imaging system (unshown) as is known in the art. Generally, and according to some embodiments, the X-ray imaging system acquires two-dimensional X-ray images of patient 606 before, during and/or after acquisition of emission data using gamma cameras 604a and 604b.

Control system 620 may comprise any general-purpose or dedicated computing system. Accordingly, control system 620 includes one or more processing units 622 configured to execute processor-executable program code to cause system 620 to operate as described herein, and storage device 630 for storing the program code. Storage device 630 may comprise one or more fixed disks, solid-state random access memory, and/or removable media (e.g., a thumb drive) mounted in a corresponding interface (e.g., a USB port).

Storage device 630 stores program code of system control program 631. One or more processing units 622 may execute system control program 631 to, in conjunction with SPECT system interface 640, control motors, servos, and encoders to cause gamma cameras 604a, 604b to rotate along gantry 602 and to acquire two-dimensional emission data at defined imaging positions during the rotation. The acquired data 632 may be stored in memory 630.

One or more processing units 622 may also execute system control program 631 to, in conjunction with CT system interface 645, cause a radiation source within CT housing 610 to emit radiation toward body 606 from different projection angles, to control a corresponding detector to acquire two-dimensional CT images, and to reconstruct three-dimensional CT images from the acquired images. The CT images may be acquired substantially contemporaneously with the emission data as described above, and the reconstructed images may be stored as CT data 633.

Reconstructed volumes 634 may comprise low-resolution volumes reconstructed from emission data 632 as described above. A reconstructed volume 634 and corresponding reconstructed three-dimensional CT image of CT data 633 may be input to a network implementing trained network parameters 635 to generate a quantitative high-resolution volume 636 as described above.

A quantitative high-resolution volume 636 may be transmitted to terminal 650 via terminal interface 648. Terminal 650 may comprise a display device and an input device coupled to system 620. Terminal 650 may display any of two-dimensional emission data, low-resolution reconstructed volumes, CT data, etc., and may receive user input for controlling display of the data, operation of imaging system 600, and/or the processing described herein. In some embodiments, terminal 650 is a separate computing device such as, but not limited to, a desktop computer, a laptop computer, a tablet computer, and a smartphone.

Each of component of system 600 may include other elements which are necessary for the operation thereof, as well as additional elements for providing functions other than those described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
   a storage device; and
   a processor to execute processor-executable process steps stored on the storage device to cause the system to:
      determine a plurality of sets of emission data acquired using a first imaging modality;
      reconstruct each of the plurality of sets of emission data to generate a plurality of low-resolution volumes;
      for each of the plurality of sets of emission data, determine a respective second data set acquired using a second imaging modality;
      segment each of the second data sets acquired using the second imaging modality;
      for each of the plurality of sets of emission data, perform multi-modal reconstruction based on the set of emission data and a respective one of the segmented second data sets to generate a respective higher-resolution volume;
      input the plurality of low-resolution volumes to an artificial neural network to generate a respective plurality of output volumes;
      compare the plurality of output volumes with respective ones of the higher-resolution volumes; and
      modify the artificial neural network based on the comparison.

2. The system according to claim 1, wherein the artificial neural network is a convolutional network, and wherein the processor is to execute processor-executable process steps to cause the system to:
   output trained kernels of the modified network to an imaging system.

3. The system according to claim 2, further comprising the imaging system, the imaging system to:
   acquire a set of emission data using the first imaging modality;
   reconstruct a first volume based on the set of emission data;
   acquire a set of transmission data using the second imaging modality;
   reconstruct a second volume based on the set of transmission data;
   input the first volume and the second volume to a second convolutional network comprising the trained kernels; and
   store a first data set generated by the second convolutional network based on the input first volume and second volume.

4. The system according to claim 1,
   wherein the first imaging modality is an emission imaging modality; and
   wherein the second imaging modality is a transmission imaging modality.

5. A method comprising:
   determining a plurality of sets of emission data acquired using a first imaging modality;
   reconstructing each of the plurality of sets of emission data to generate a plurality of low-resolution volumes;
   for each of the plurality of sets of emission data, determining a respective second data set acquired using a second imaging modality;
   segmenting each of the second data sets acquired using the second imaging modality;
   for each of the plurality of sets of emission data, performing multi-modal reconstruction based on the set of emission data and a respective one of the segmented second data sets to generate a respective higher-resolution volume;
   inputting the plurality of low-resolution volumes to an artificial neural network to generate a respective plurality of output volumes;
   comparing the plurality of output volumes with respective ones of the higher-resolution volumes; and
   modifying the artificial neural network based on the comparison.

6. The method according to claim 5, wherein the artificial neural network is a convolutional network, and further comprising:
   outputting trained kernels of the modified network to an imaging system.

7. The method according to claim 6, further comprising:
   acquiring a set of emission data using the first imaging modality;
   reconstructing a first volume based on the set of emission data;
   acquiring a set of transmission data using the second imaging modality;
   reconstructing a second volume based on the set of transmission data;
   inputting the first volume and the second volume to a second convolutional network comprising the trained kernels; and
   storing a first data set generated by the second convolutional network based on the input first volume and second volume.

8. The method according to claim 5,
wherein the first imaging modality is an emission imaging modality; and
wherein the second imaging modality is a transmission imaging modality.

9. A system comprising:
a storage device storing:
  a plurality of sets of emission data acquired using a first imaging modality;
  a plurality of second data sets acquired using a second imaging modality and corresponding to respective ones of the plurality of sets of emission data; and
  nodes of an artificial neural network; and
a processor to execute processor-executable process steps stored on the storage device to cause the system to:
  reconstruct each of the plurality of sets of emission data to generate a plurality of low-resolution volumes;
  segment each of the second data sets acquired using the second imaging modality;
  for each of the plurality of sets of emission data, perform multi-modal reconstruction based on the set of emission data and a respective one of the segmented second data sets to generate a respective higher-resolution volume;
  input the plurality of low-resolution volumes to an artificial neural network to generate a respective plurality of output volumes;
  compared the plurality of output volumes with respective ones of the higher-resolution volumes, and
  modify the artificial neural network based on the comparison.

10. The system according to claim 9, wherein the artificial neural network is a convolutional network, and wherein the processor is to execute processor-executable process steps to cause the system to:
  output trained kernels of the modified network to an imaging system.

11. The system according to claim 10, further comprising the imaging system, the imaging system to:
  acquire a set of emission data using the first imaging modality;
  reconstruct a first volume based on the set of emission data;
  acquire a set of transmission data using the second imaging modality;
  reconstruct a second volume based on the set of transmission data;
  input the first volume and the second volume to a second convolutional network comprising the trained kernels; and
  store a first data set generated by the second convolutional network based on the input first volume and second volume.

12. The system according to claim 9,
wherein the first imaging modality is an emission imaging modality; and
wherein the second imaging modality is a transmission imaging modality.

* * * * *